UNITED STATES PATENT OFFICE.

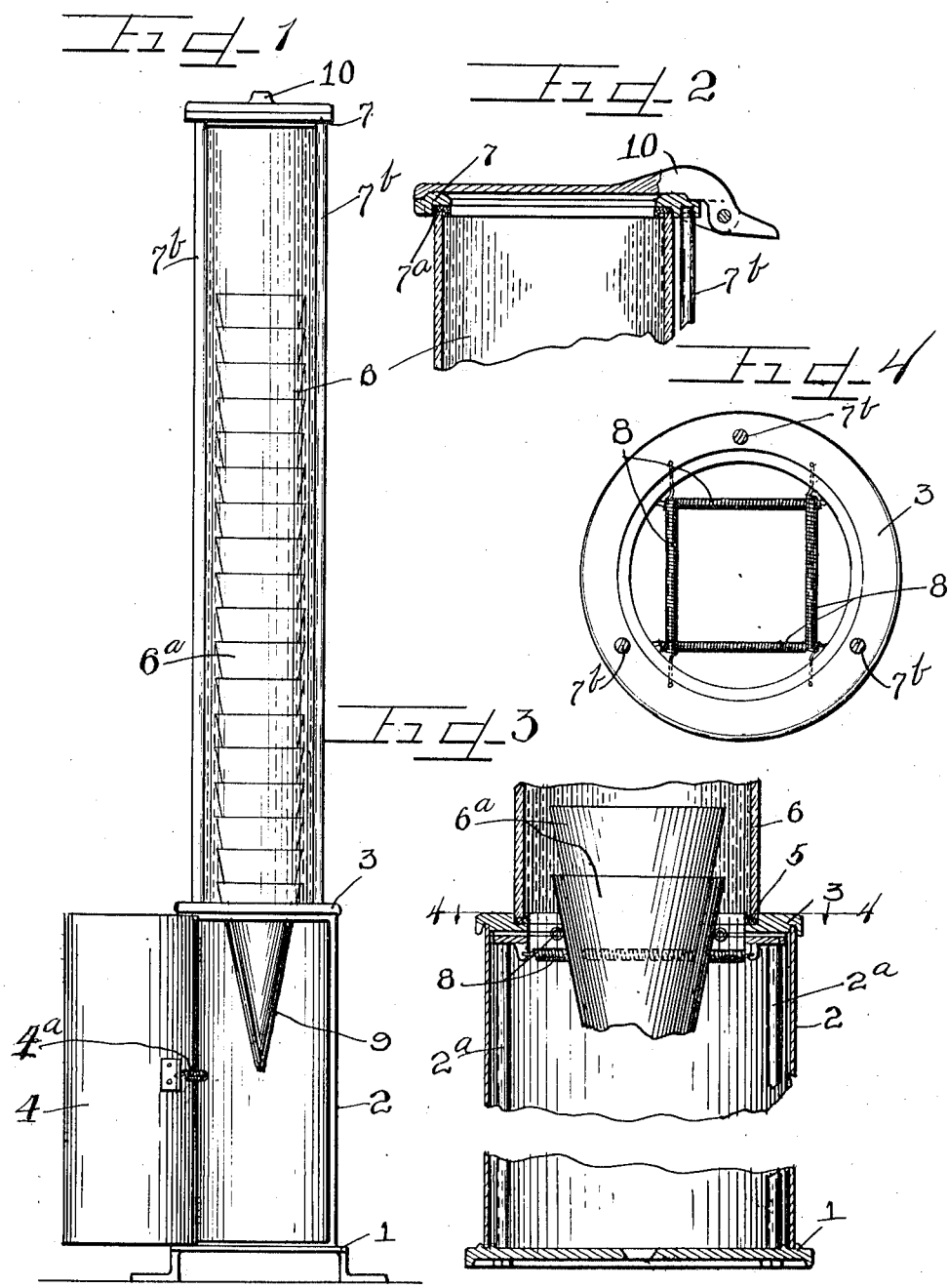

FRANK L. TARBELL, OF CHICAGO, ILLINOIS, ASSIGNOR OF ONE-HALF TO MILAN H. FISHER, OF CHICAGO, ILLINOIS.

ICE-CREAM-CONE DISPENSER.

1,041,192.  Specification of Letters Patent.  Patented Oct. 15, 1912.

Application filed April 24, 1911. Serial No. 622,924.

*To all whom it may concern:*

Be it known that I, FRANK L. TARBELL, a citizen of the United States, and a resident of the city of Chicago, in the county of Cook and State of Illinois, have invented certain new and useful Improvements in Ice-Cream-Cone Dispensers; and I do hereby declare that the following is a full, clear, and exact description of the same, reference being had to the accompanying drawings, and to the numbers of reference marked thereon, which form a part of this specification.

Ice cream and some other foods are now very extensively dispensed in edible cones constructed of pastry and which serve as a cup for the ice cream and impart a pleasing flavor as well. Such cones have heretofore been usually manufactured and sold in large quantities, and although usually wrapped with some care at the factory to prevent contamination, they have never been adequately protected where dispensed. Owing to the nature of the material of which constructed, such cones are particularly susceptible to contamination, bacterial and otherwise, and unquestionably, in the absence of proper precaution, are often sold in a very unsanitary condition.

The object of this invention is to afford a dispensing apparatus for ice cream cones in which the cones are protected from moisture and dust at all times, and from which the dispenser can draw the cones one by one without exposing the remaining cones in the dispensing apparatus to contamination of any kind.

It is also an object of the invention to afford a construction in which the cones to be dispensed are supported in plain view of the purchaser and inclosed in a sanitary casing from which dust and dirt is excluded.

It is also an object of the invention to afford resilient means in connection with such a device whereon the cones are supported in nested condition, and from which the cones may be withdrawn one by one.

The invention consists in the matters hereinafter described and more fully pointed out and defined in the appended claims.

In the drawings: Figure 1 is a front elevation of a device embodying my invention, showing the door opened. Fig. 2 is an enlarged, fragmentary, vertical section taken at the top of the device. Fig. 3 is an enlarged, fragmentary, vertical section taken at the bottom of the device. Fig. 4 is a section on line 4—4 of Fig. 3.

As shown in the drawings: A base 1, which may be constructed of metal or of any suitable material, is provided with an upwardly facing channel extending about the same near its periphery, as shown in Fig. 3, in which is seated a casing 2, preferably cylindric and of a height to afford convenient access into the bottom of the machine for the removal of the cones. Said casing or shell 2, may be metallic, if preferred. Secured on said shell is an annular cap or head 3, provided with a groove near its periphery to receive the shell or casing 2, therein. As shown, said ends of the casing are rigidly connected by means of the bolts $2^a$. Said casing is provided with a door 4, in one side thereof, which is held normally closed by means of a spring $4^a$, connected on the inner side thereof and on the inner side of the casing, as shown in Fig. 1.

An annular recess or seat is provided in the top of the cap 3, near the inner periphery thereof and seated therein is a gasket 5, of rubber or other suitable material, and fitted into said recess and supported on said gasket 5, is a tube or container 6, preferably of glass or other transparent material and which is of sufficient length to afford a capacity for the machine sufficient to receive a large number of the cones $6^a$, nested, as shown in Fig. 1.

Supported on the top of said tube is an annular cap 7, having a recess on its under side in which is provided a gasket $7^a$, which bears on the top of the tube, and said top is rigidly connected with the cap 3, by means of bolts $7^b$, which not only strengthens the construction, but as well, protects the tube from injury. Hinged on said top 7, is a cover 10, adapted to be opened to permit the insertion of the cones.

The cones are yieldingly supported in said casing and tube by means of springs 8, which in the present instance, though not necessarily so, are shown as spiral springs arranged about and across the opening through the cap 3, as shown in Figs. 3 and 4, and which yieldingly engage the sides of the lowermost cone near the top, exerting a gentle pressure, but sufficient to support the contents of the device.

The operation is as follows: In dispensing, the operator opens the door and removes the lowermost cone by pulling the same gently downward until the top passes below the springs, which, of course, immediately engage the next succeeding cone, again supporting the nest. The door closes automatically to exclude dust.

While I have shown an arrangement of spiral springs for the purpose of releasably supporting the cones, it is, of course, to be understood that the particular supporting means may be varied, and that other than metallic springs may be used, if desired. I therefore do not purpose limiting the patent to be granted on this application otherwise than necessitated by the prior art.

I claim as my invention:

1. A cone dispensing apparatus embracing a casing having cover and a door, a plurality of resilient means arranged above and transversely each other in the casing adjacent the top of the door and adapted to successively support thereon a nest of the cones by engagement with the bottom cone and permitting said cones to be successively withdrawn from the bottom.

2. A dispensing apparatus for cones embracing a casing, a cover and a door, a plurality of horizontal springs arranged in pairs one above the other, extending across the casing and adapted to successively support the contents of the casing releasably thereon, a part of said casing above said resilient supporting means being transparent to permit inspection of the contents.

3. A dispensing apparatus embracing a metallic cylindric casing, an automatically closing door in one side thereof, a transparent container supported on the casing and communicating therein, a cover therefor, and a plurality of pairs of spiral springs arranged one pair above another and stretched across the communication between the casing and container and acting to yieldingly and successively support the contents of the container thereon.

4. A commodity receptacle embracing a container, a removable cover thereon, independent resilient members secured at each end and positioned one above the other adapted to control the passage of articles therethrough, said members being adapted to yield downwardly to permit of the discharge of an article, and to return to its normal position after such discharge to engage and prevent the discharge of the adjacent articles, and a compartment into which a portion of the lowermost article normally projects.

5. In a commodity receptacle, the combination of a container, coiled springs at the lower end of the container for controlling the passage of articles therethrough, said springs adapted to yield downwardly and outwardly to permit the discharge of an article, and to return to normal position after such discharge to engage and prevent the discharge of the adjacent article, and a compartment into which a portion of the lowermost article normally projects, the walls of said compartment being cut away to provide an opening.

6. A dispensing apparatus embracing a cylindric casing, a door in the side thereof, a cylindric transparent container supported on the casing and communicating therein, an annular cap on the top of said container, a plurality of bolts connecting said casing and cap adapted to rigidly secure the container to the casing and protect the same from injury, a cover hinged on said cap adapted to be opened to permit the insertion of articles into the container, a pair of spiral springs arranged across the communication between the casing and container, a second pair of spiral springs arranged slightly beneath the first mentioned springs and at right angles therewith, said springs coöperating with each other to permit the discharge of an article and after such discharge to engage and prevent the discharge of the adjacent article.

7. A dispensing apparatus embracing a casing, a normally closed door in the side thereof, a transparent container supported on the casing and communicating therein, a cap on the top of said container, a plurality of bolts connecting said casing and cap adapted to rigidly secure the container to the casing and protect the same from injury, a pair of spiral springs arranged across the communication between the casing and container, a second pair of spiral springs arranged beneath the first mentioned springs and at an angle therewith, said springs coöperating with each other to permit the discharge of an article and after such discharge, to engage and prevent the discharge of the adjacent article.

8. In a device of the class described a casing, a door in the side thereof, a transparent container supported on the casing and communicating therein, a cap on said container, a cover hinged on said cap adapted to be opened to permit the insertion of articles into the container, resilient members secured at each end one above the other and said members coöperating with each other to permit the discharge of an article and after such discharge, to engage and prevent the discharge of the adjacent article.

9. A dispensing apparatus embracing a cylindric casing, a door in the side thereof, a cylindric transparent container supported on the casing and communicating therein, an annular cap on the top of said container, means connecting said casing and cap adapted to rigidly secure the container to the casing and protect the same from injury, a cover hinged on said cap adapted to be opened to permit the insertion of articles into the container, a plurality of spiral springs arranged across the communication between the casing and container, at different angles and heights with relation to each other, said springs coöperating with each other to permit the discharge of an article and after such discharge, to engage and prevent the discharge of the adjacent article.

10. A dispensing apparatus embracing a casing, a container supported on the casing and communicating therein, a cap on the top of said container, means connecting said casing and cap adapted to rigidly secure the container to the casing and protect the same from injury, a cover hinged on said cap adapted to be opened to permit the insertion of articles into the container, a plurality of spiral springs arranged across the communication between the casing and container, said springs coöperating with each other to permit the discharge of an article and after such discharge, to engage and prevent the discharge of the adjacent article.

In testimony whereof I have hereunto subscribed my name in the presence of two subscribing witnesses.

FRANK L. TARBELL.

Witnesses:
SAMUEL LEVISON,
LAWRENCE REIBSTEIN.